(12) United States Patent
Iwamoto

(10) Patent No.: US 12,366,726 B2
(45) Date of Patent: Jul. 22, 2025

(54) OPTICAL SYSTEM AND IMAGE PICKUP APPARATUS HAVING THE SAME

(71) Applicant: CANON KABUSHIKI KAISHA, Tokyo (JP)

(72) Inventor: Shunji Iwamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 542 days.

(21) Appl. No.: 17/839,571

(22) Filed: Jun. 14, 2022

(65) Prior Publication Data

US 2023/0010047 A1 Jan. 12, 2023

(30) Foreign Application Priority Data

Jul. 6, 2021 (JP) ................. 2021-112065

(51) Int. Cl.
*G02B 9/64* (2006.01)
*G02B 27/64* (2006.01)
*G03B 5/02* (2021.01)

(52) U.S. Cl.
CPC ............... *G02B 9/64* (2013.01); *G02B 27/64* (2013.01); *G03B 5/02* (2013.01)

(58) Field of Classification Search
CPC ........ G02B 9/64; G02B 9/0035; G02B 27/64; G02B 27/646; G03B 5/02
See application file for complete search history.

(56) References Cited

U.S. PATENT DOCUMENTS

| | | | |
|---|---|---|---|
| 9,217,851 B2 | 12/2015 | Iwamoto | |
| 10,078,202 B2 | 9/2018 | Iwamoto | |
| 10,416,421 B2 | 9/2019 | Iwamoto | |
| 10,663,703 B2 | 5/2020 | Iwamoto | |
| 10,754,169 B2 | 8/2020 | Iwamoto | |
| 11,131,829 B2 | 9/2021 | Iwamoto | |
| 11,181,717 B2 | 11/2021 | Iwamoto | |
| 2014/0055659 A1 | 2/2014 | Iwamoto | |
| 2019/0004277 A1* | 1/2019 | Iwamoto | G02B 13/22 |
| 2019/0293906 A1* | 9/2019 | Nakazawa | G02B 13/02 |
| 2022/0043243 A1 | 2/2022 | Iwamoto | |

FOREIGN PATENT DOCUMENTS

| | | |
|---|---|---|
| JP | 2004-061677 A | 2/2004 |
| JP | 2008-151949 A | 7/2008 |
| JP | 2008-268787 A | 11/2008 |
| JP | 2015-152812 A | 8/2015 |
| JP | 2015-156010 A | 8/2015 |
| JP | 2017-116679 A | 6/2017 |

OTHER PUBLICATIONS

Notice of Reasons for Refusal issued by the Japanese Patent Office on May 7, 2025 in corresponding JP Patent Application No. 2021-112065, with English translation.

* cited by examiner

*Primary Examiner* — James A Dudek
(74) *Attorney, Agent, or Firm* — Carter, DeLuca & Farrell LLP

(57) ABSTRACT

An optical system includes, in order from an object side to an image side, a first lens unit having a negative refractive power, a second lens unit having a positive refractive power, and a third lens unit having a positive refractive power. During image stabilization, the second lens unit is moved in a direction including a component in a direction orthogonal to an optical axis of the optical system, and the first lens unit and the third lens unit are fixed. A predetermined condition is satisfied.

16 Claims, 5 Drawing Sheets

OPTICAL SYSTEM AND IMAGE PICKUP APPARATUS HAVING THE SAME

BACKGROUND OF THE INVENTION

Field of the Invention

The present invention relates to an optical system, which is suitable for a digital video camera, a digital still camera, a broadcasting camera, a film-based camera, a surveillance camera, and the like.

Description of the Related Art

An optical system having a wide-angle of view, large aperture ratio, small size, high optical performance, and image stabilizing function for stabilizing a captured image has conventionally been proposed (see Japanese Patent Laid-Open No. ("JP") 2015-152812).

However, it is difficult to correct coma, chromatic aberration, and one-sided defocusing during image stabilization in the optical system having the wide-angle of view and large diameter ratio disclosed in JP 2015-152812.

SUMMARY OF THE INVENTION

The present invention provides an optical system having good optical performance during image stabilization, and an image pickup apparatus having the same.

An optical system according to one aspect of the present invention includes, in order from an object side to an image side, a first lens unit having a negative refractive power, a second lens unit having a positive refractive power, and a third lens unit having a positive refractive power. During image stabilization, the second lens unit is moved in a direction including a component in a direction orthogonal to an optical axis of the optical system, and the first lens unit and the third lens unit are fixed. The following conditional expressions are satisfied:

$$2.0 < |f1/f| < 100.0$$

$$4.4 < f2/f < 100.0$$

$$-0.3 < f/r21 < 0.1$$

where f is a focal length of the optical system in an in-focus state at infinity, f1 is a focal length of the first lens unit, f2 is a focal length of the second lens unit, and r21 is a radius of curvature of a lens surface closest to an object in the second lens unit. An image pickup apparatus including the above optical system also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of examples of an optical system and an image pickup apparatus having the same according to the present invention.

Figure 1:
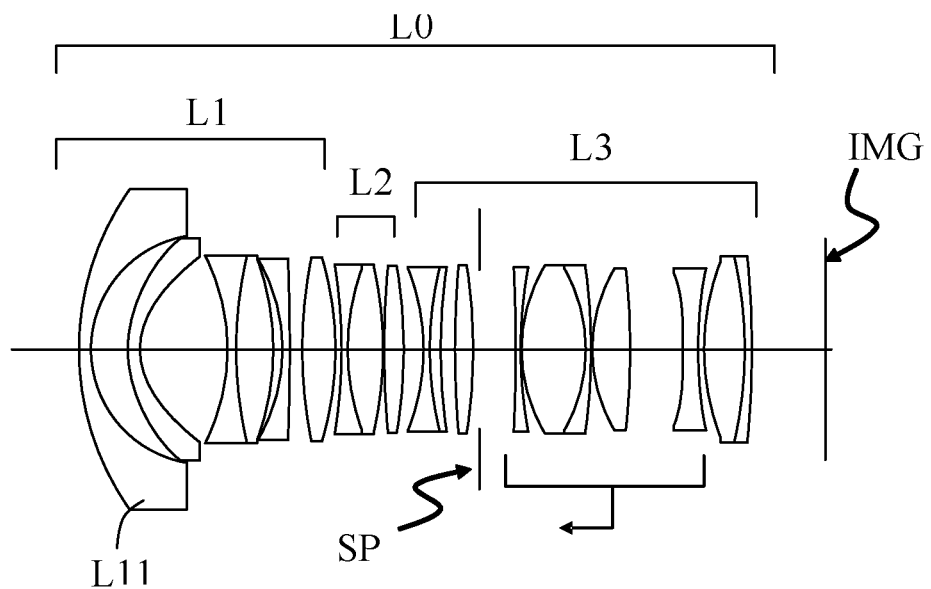
FIG. 1 is a sectional view of an optical system according to Example 1 in an in-focus state at infinity.
Figure 4:
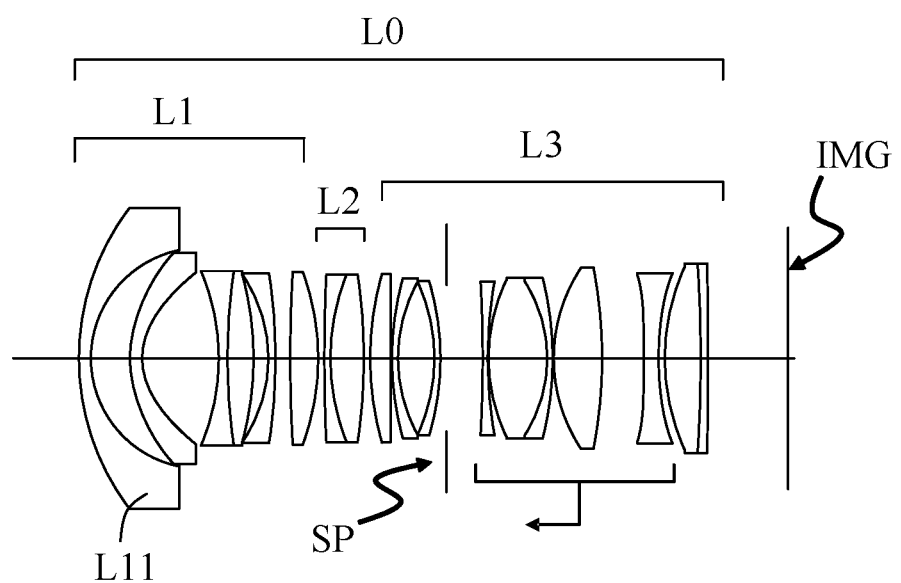
FIG. 4 is a sectional view of an optical system according to Example 2 in an in-focus state at infinity.
Figure 7:
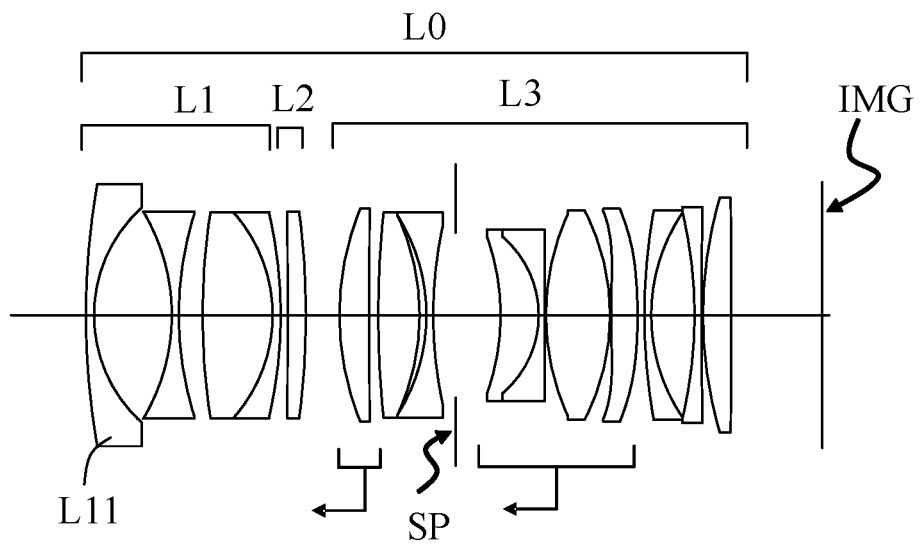
FIG. 7 is a sectional view of an optical system according to Example 3 in an in-focus state at infinity.

FIGS. 1, 4, and 7 are sectional views of optical systems according to Examples 1 to 3 in in-focus states at infinity, respectively. The optical system according to each example is an optical system for an image pickup apparatus such as a digital video camera, a digital still camera, a broadcasting camera, a film-based camera, and a surveillance camera.

In each sectional view, a left side is an object side and a right side is an image side. The optical system according to each example includes a plurality of lens units. In this specification, a lens unit is a group of lenses that integrally move or stand still when image stabilization is performed. The lens unit may include one or more lenses. The lens unit may include a diaphragm (aperture stop).

An optical system L0 according to each example includes, in order from the object side to the image side, a first lens unit L1 having a negative refractive power, a second lens unit L2 having a positive refractive power, and a third lens unit L3 having a positive refractive power.

SP represents an aperture stop or diaphragm. IMG represents an image plane, and when the optical system according to each example is used as an imaging optical system of a digital still camera or a digital video camera, an imaging plane of a solid-state image sensor (photoelectric conversion element) such as a CCD sensor or a CMOS sensor is placed on the image plane IMG. When the optical system according to each example is used as the imaging optical system of a film-based camera, a photosensitive plane corresponding to a film plane is placed on the image plane IMG.

Figure 2:
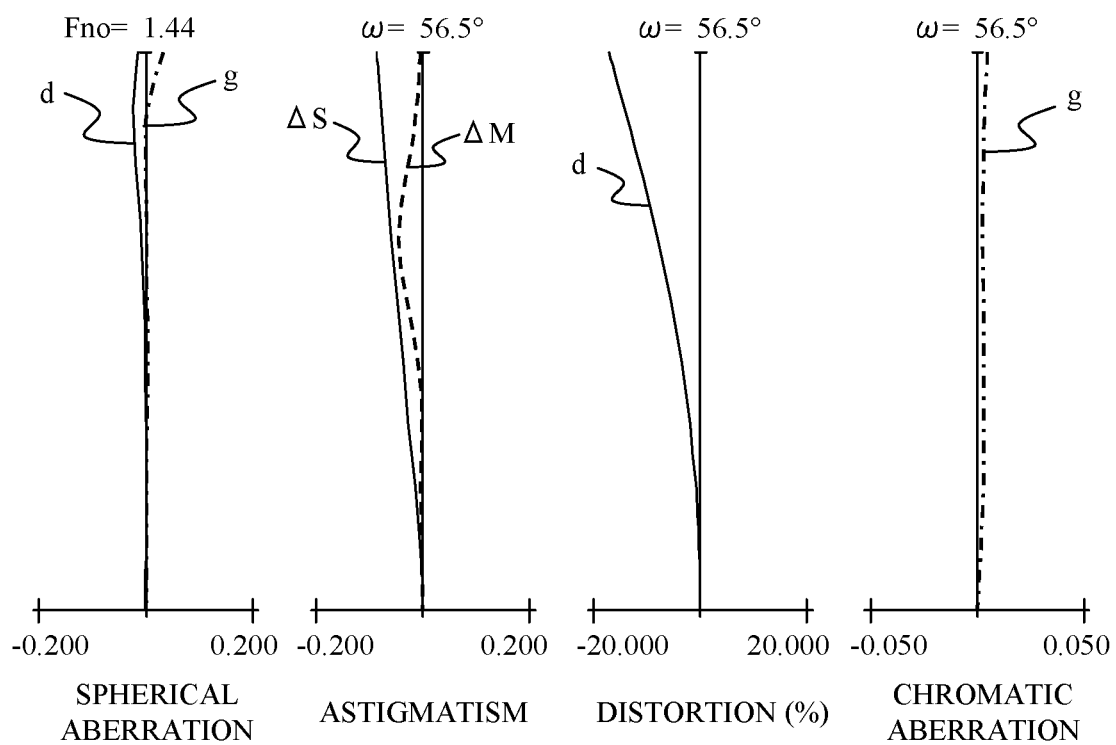
FIG. 2 is a longitudinal aberration diagram of the optical system according to Example 1 in the in-focus state at infinity.
Figure 3:
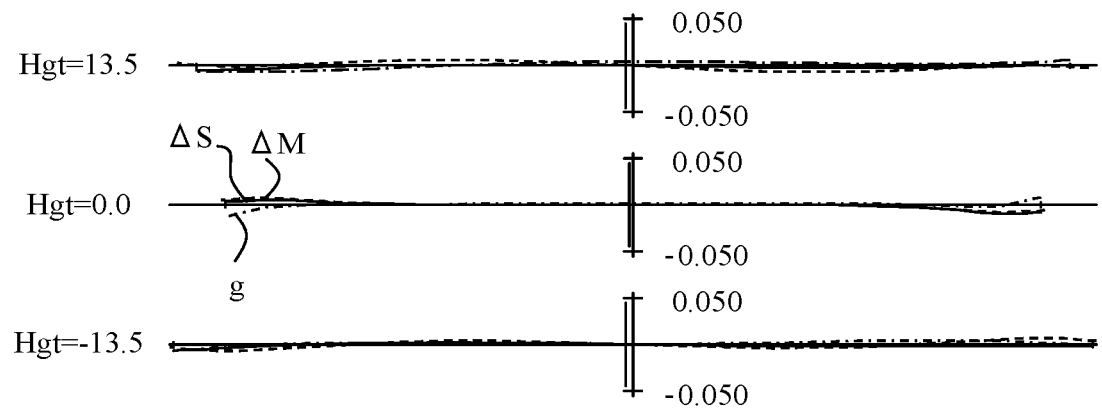
FIG. 3 is a lateral aberration diagram of the optical system according to Example 1 in the in-focus state at infinity with image stabilization at 0.5 degrees.
Figure 5:
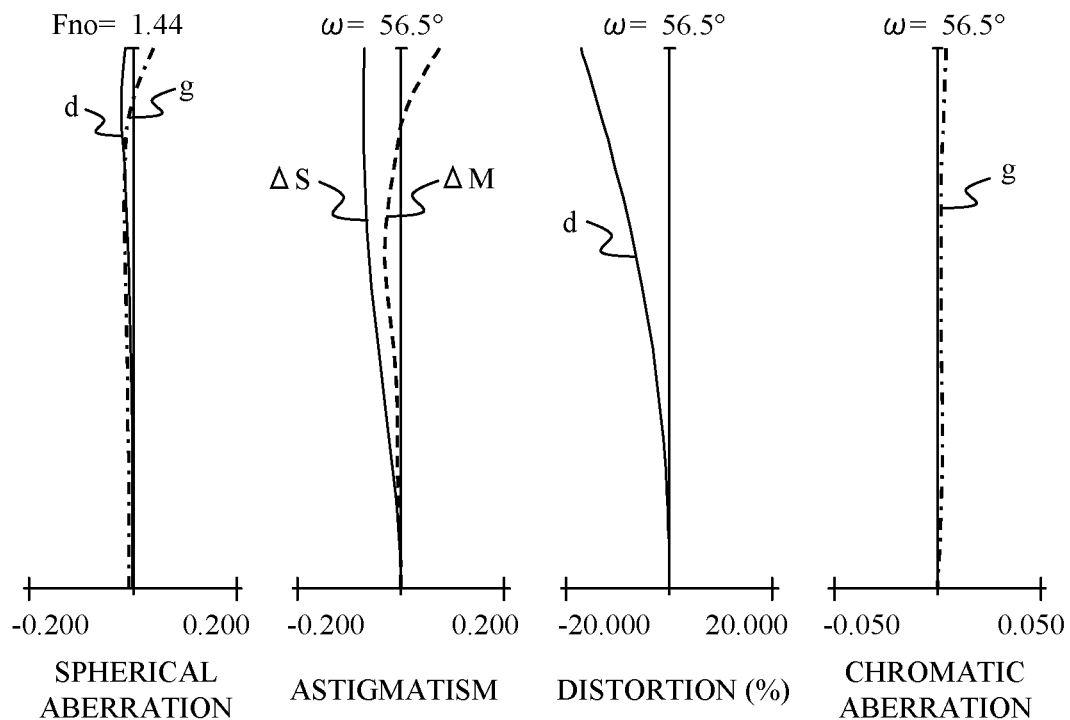
FIG. 5 is a longitudinal aberration diagram of the optical system according to Example 2 in the in-focus state at infinity.
Figure 6:
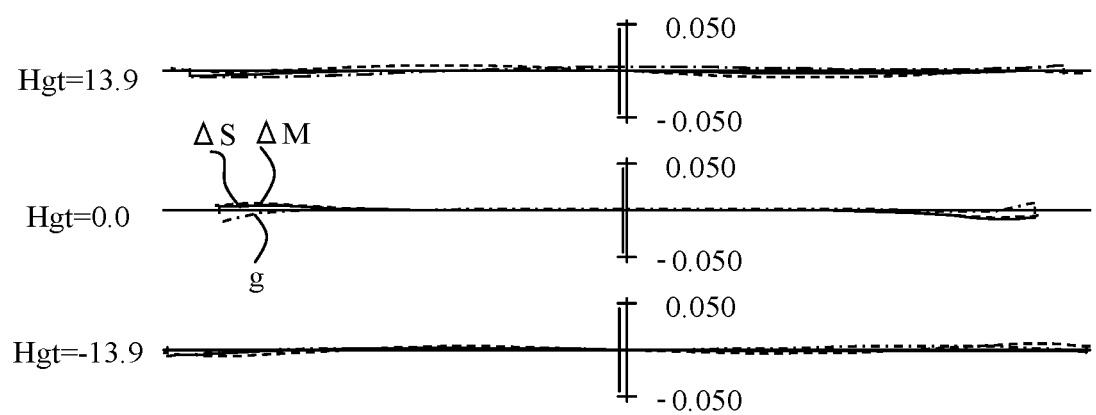
FIG. 6 is a lateral aberration diagram of the optical system according to Example 2 in the in-focus state at infinity with image stabilization at 0.5 degrees.
Figure 8:
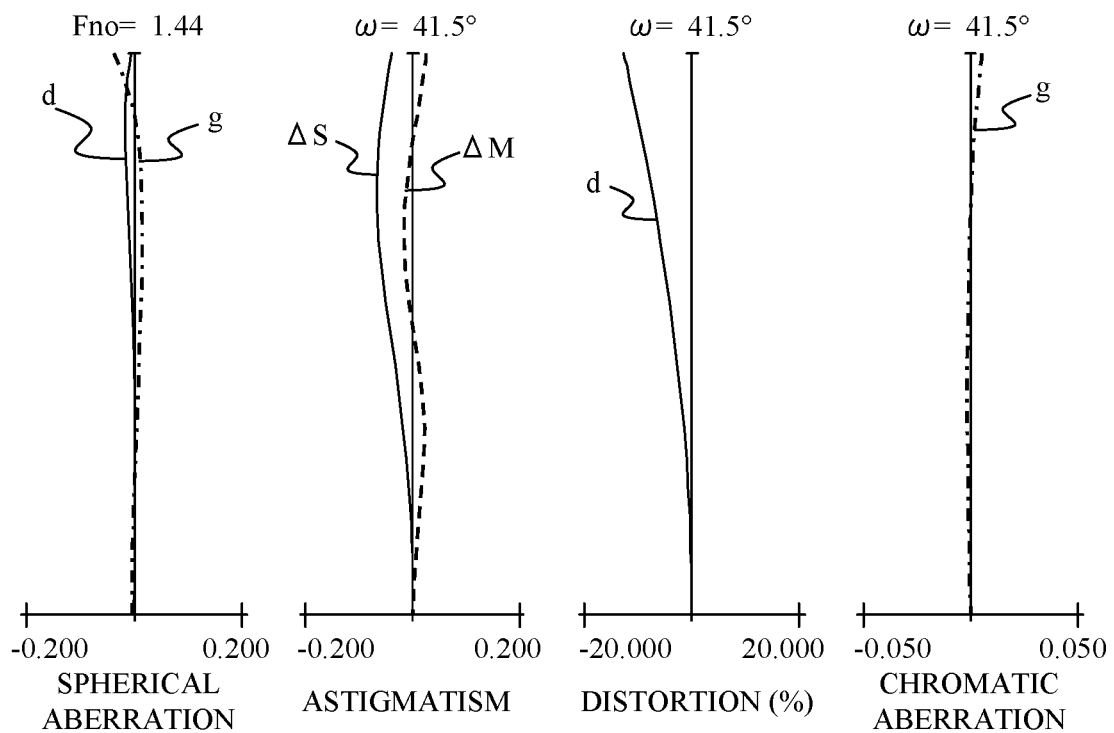
FIG. 8 is a longitudinal aberration diagram of the optical system according to Example 3 in the in-focus state at infinity.
Figure 9:
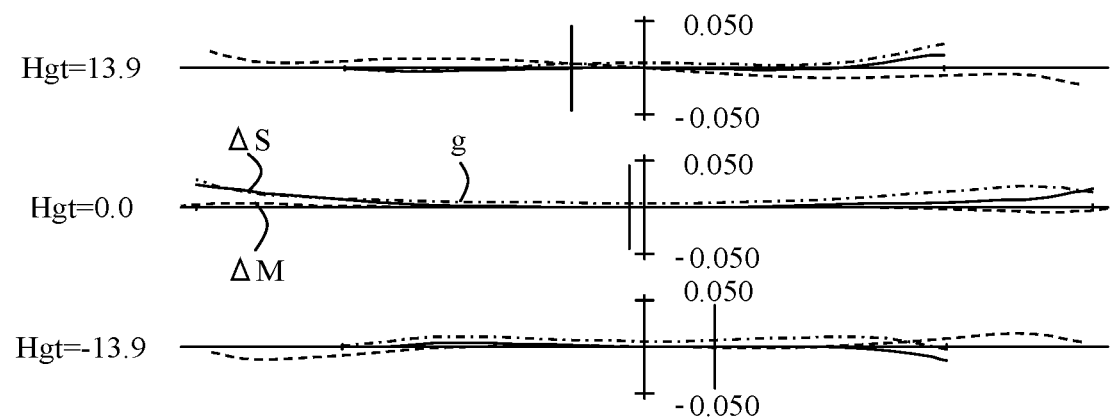
FIG. 9 is a lateral aberration diagram of the optical system according to Example 3 in the in-focus state at infinity with image stabilization at 0.5 degrees.

FIGS. 2, 5, and 8 are longitudinal aberration diagrams of the optical systems according to Examples 1 to 3 in the in-focus states at infinity, respectively. FIGS. 3, 6, and 9 are lateral aberration diagrams of the optical systems according to Examples 1 to 3 in the in-focus states at infinity with image stabilization at 0.5 degrees.

The spherical aberration diagram illustrates spherical aberration amounts for the d-line (wavelength 587.6 nm) and the g-line (wavelength 435.8 nm), in which Fno represents an F-number. In the astigmatism diagram, ΔS indicates an astigmatism amount on a sagittal image plane, and ΔM indicates an astigmatism amount on a meridional image plane. The distortion diagram illustrates a distortion amount for the d-line. The chromatic aberration diagram illustrates a chromatic aberration amount for the g-line. (ο represents an imaging half angle of view (degrees).

Next follows a description of a characteristic configuration of the optical system L0 according to each example.

The optical system L0 according to each example has a so-called retrofocus type lens configuration in which a negative lens unit is disposed on the object side and a positive lens unit is disposed on the image side. This configuration facilitates a wider angle of view.

During image stabilization, the second lens unit L2 is moved in a direction including a component in a direction orthogonal to the optical axis of the optical system L0, and the first lens unit L1 and the third lens unit L3 are fixed. Thereby, the imaging position is moved and image stabilization is performed. Setting the second lens unit L2 disposed at the intermediate position of the optical system L0 to the image stabilizing lens unit can make a light ray height of an off-axis light beam relatively low, and make small the second lens unit L2 as the image stabilizing lens unit.

The optical system according to each example satisfies the following conditional expressions (1) and (2).

$$2.0<|f1/f|<100.0 \quad (1)$$

$$4.4<f2/f<100.0 \quad (2)$$

Here, f is a focal length of the optical system L0 in the in-focus at infinity. f1 is a focal length of the first lens unit L1. f2 is a focal length of the second lens unit L2.

The conditional expression (1) defines a ratio between the focal length of the first lens unit L1 and the focal length of the optical system L0 in the in-focus state at infinity. If the absolute value of the focal length of the first lens unit L1 becomes larger and the value is higher than the upper limit of the conditional expression (1), the retrofocus power arrangement is weakened and it becomes difficult to realize a wider angle of view. When the absolute value of the focal length of the first lens unit L1 becomes smaller and the value is lower than the lower limit of the conditional expression (1), the effect diverged by the first lens unit L1 becomes stronger. Thereby, the angle of the on-axis light beam incident on the second lens unit L2 becomes large, and it becomes difficult to correct aberrations during image stabilization, particularly coma.

The conditional expression (2) defines a ratio between the focal length of the second lens unit L2 and the focal length of the optical system L0. If the focal length of the second lens unit L2 is larger and the value is higher than the upper limit of the conditional expression (2), a moving amount for image stabilization becomes large, the driving mechanism becomes large, and it becomes difficult to make small the image pickup apparatus. If the focal length of the second lens unit L2 is smaller and the value is lower than the lower limit of the conditional expression (2), it becomes difficult to correct aberrations during image stabilization, especially one-sided defocusing and chromatic aberration.

Due to the above configuration, the optical system L0 according to each example can have good optical performance during image stabilization. The optical system L0 according to each example can have a small size and high optical performance while achieving both a wide angle of view and a large aperture ratio.

The numerical ranges of the conditional expressions (1) and (2) may be replaced with those of the following conditional expressions (1a) and (2a).

$$2.5<|f1/f|<30.0 \quad (1a)$$

$$4.6<f2/f<20.0 \quad (2a)$$

The numerical ranges of the conditional expressions (1) and (2) may be replaced with those of the following conditional expressions (1b) and (2b).

$$3.0<|f1/f|<20.0 \quad (1b)$$

$$4.8<f2/f<12.0 \quad (2b)$$

Next follows a description of a configuration that may be satisfied in the optical system according to each example.

Part of the third lens unit L3 is moved along the optical axis of the optical system L0 during focusing. An arrow illustrated in each sectional view indicates a moving direction of the lens unit during focusing from infinity to a short distance. Focusing using part of the third lens unit L3 disposed on the image side can reduce the weight and size of the third lens unit L3 as the focus lens unit.

The second lens unit L2 may be fixed during focusing. If the second lens unit L2 as the image stabilizing lens unit is moved during focusing, the driving mechanism becomes complicated and the image pickup apparatus becomes large.

A negative lens L11 is disposed closest to the object in the first lens unit L1. This configuration can facilitate a wider angle of view.

The first lens unit L1 may include one positive lens and three negative lenses. This configuration can easily achieve good optical performance with a wide angle of view.

The second lens unit L2 may have a three-lens configuration that includes a negative lens, a positive lens, and a positive lens in order from the object side to the image side, or a two-lens configuration that includes a negative lens and a positive lens in order from the object side to the image side, or a one-lens configuration having a positive lens. When the second lens unit L2 includes a relatively small number of lenses, the weight and size of the second lens unit L2 as the image stabilizing lens unit can be made smaller. When the second lens unit L2 includes a plurality of lenses, disposing a negative lens on the object side and a positive lens on the image side is advantageous for a wider angle of view.

The third lens unit L3 may include four positive lenses and four negative lenses. Thereby, it becomes easy to satisfactorily correct a spherical aberration, a longitudinal chromatic aberration, and a curvature of field, and it becomes easy to realize good optical performance with a large aperture ratio.

Next follows a description of conditions which the optical system according to each example may satisfy. The optical system according to each example may satisfy one or more of the following conditional expressions (3) to (7).

$$1.0<f3/f<10.0 \quad (3)$$

$$0.3<sk/f<3.0 \quad (4)$$

$$-0.3<f/r21<0.2 \quad (5)$$

$$0.5<t1/f<5.0 \quad (6)$$

$$1.0<|f11/f|<5.0 \quad (7)$$

Here, f3 is a focal length of the third lens unit L3 in the in-focus state at infinity. sk is a distance on the optical axis from a lens surface closest to an image plane to the image plane in the in-focus state at infinity (back focus hereinafter). r21 is a radius of curvature of a lens surface closest to the object of the second lens unit L2. t1 is a distance on the optical axis from a lens surface closest to the object of the first lens unit L1 to a lens surface closest to the image plane of the first lens unit (thickness of the first lens unit L1 hereinafter). f11 is a focal length of the negative lens L11 disposed closest to the object of the first lens unit L1.

The conditional expression (3) defines a ratio between the focal length of the third lens unit L3 and the focal length of the optical system L0. If the focal length of the third lens unit L3 becomes larger and the value is higher than the upper limit of the conditional expression (3), it becomes difficult to secure the back focus. When the focal length of the third lens unit L3 becomes smaller and the value is lower than the lower limit of the conditional equation (3), the aberration generated in the third lens unit L3 becomes significant, and it is particularly difficult to correct distortion and lateral chromatic aberration.

The conditional expression (4) defines a ratio between the back focus and the focal length of the optical system L0. If the back focus becomes larger and the value is higher than the upper limit of the conditional expression (4), the optical system L0 becomes large. If the back focus becomes smaller and the value is higher than the lower limit of the conditional expression (4), it becomes difficult to dispose the lens near the image plane.

The conditional expression (5) defines a ratio between the focal length of the optical system L0 and the radius of curvature of the lens surface closest to the object of the second lens unit L2. When the radius of curvature of the lens surface closest to the object of the second lens unit L2 becomes larger in the positive direction, that is, when the lens surface becomes convex toward the object side, and the value is higher than the upper limit of the conditional expression (5), the angle of incidence of the on-axis light on the second lens unit L2 becomes large. Thereby, it becomes difficult to correct various aberrations during eccentricity, especially eccentric coma. When the radius of curvature of the lens surface closest to the object of the second lens unit L2 becomes larger in the negative direction, that is, when the lens surface becomes a convex shape toward the image side and the value is lower than the lower limit of the conditional expression (5), the angle of incidence of the off-axis light on the second lens unit L2 becomes large. Thereby, it becomes difficult to correct various aberrations during eccentricity, especially one-sided defocusing.

The conditional expression (6) defines a ratio between the thickness of the first lens unit L1 and the focal length of the optical system L0. If the thickness of the first lens unit L1 becomes larger and the value is higher than the upper limit of the conditional expression (6), the optical system L0 becomes large. If the thickness of the first lens unit L1 becomes smaller and the value is lower than the lower limit of the conditional expression (6), corrections of off-axis aberrations become insufficient, and it becomes particularly difficult to correct distortion and lateral chromatic aberration.

The conditional expression (7) defines a ratio between the focal length of the negative lens L11 disposed closest to the object of the first lens unit L1 and the focal length of the optical system L0. If the absolute value of the focal length of the negative lens L11 becomes larger and the value is higher than the upper limit of the conditional expression (7), it becomes difficult to provide a wider angle of view. If the absolute value of the focal length of the negative lens L11 becomes smaller and the value is lower than the lower limit of the conditional equation (7), the aberration generated in the negative lens L11 becomes significant, and it is particularly difficult to correct distortion and lateral chromatic aberration.

The numerical ranges of the conditional expressions (3) to (7) may be replaced with those the following conditional expressions (3a) to (7a).

$$1.4 < f3/f < 4.0 \tag{3a}$$

$$0.4 < sk/f < 2.0 \tag{4a}$$

$$-0.2 < f/r21 < 0.1 \tag{5a}$$

$$0.8 < t1/f < 4.0 \tag{6a}$$

$$1.5 < |f11/f| < 4.0 \tag{7a}$$

The numerical ranges of the conditional expressions (3) to (7) may be replaced with those of the following conditional expressions (3b) to (7b).

$$1.5 < f3/f < 3.5 \tag{3b}$$

$$0.5 < sk/f < 1.0 \tag{4b}$$

$$-0.18 < f/r21 < 0.06 \tag{5b}$$

$$1.1 < t1/f < 3.2 \tag{6b}$$

$$1.8 < |f11/f| < 3.3 \tag{7b}$$

A detailed description will now be given of the optical system L0 according to each example.

Each of the optical systems L0 according to Examples 1 to 3 includes, in order from the object side to the image side, the first lens unit L1 having the negative refractive power, the second lens unit L2 having the positive refractive power, and the third lens unit L3 having the positive refractive power. Part of the third lens unit L3 is moved along the optical axis of the optical system L0 during focusing. The first lens unit L1 includes the negative lens L11 disposed closest to the object. The diaphragm SP is disposed in the third lens unit L3. Image stabilization is performed by moving the second lens unit L2 in a direction including a component in a direction orthogonal to the optical axis.

A description will now be given of numerical examples 1 to 3 corresponding to Examples 1 to 3, respectively.

In surface data in each numerical example, r represents a radius of curvature of each optical surface, and d (mm) represents an on-axis distance (a distance on the optical axis) between an m-th surface and an (m+1)-th surface, where m is a surface number counted from the light incident side. nd represents a refractive index of each optical element for the d-line, and vd represents an Abbe number of the optical element. The Abbe number vd of a certain material is calculated as follows:

$$vd=(Nd-1)/(NF-NC)$$

where Nd, NF, and NC are refractive indexes in the Fraunhofer line for the d-line (587.6 nm), F-line (486.1 nm), and C-line (656.3 nm), respectively.

In each numerical example, each of d, focal length (mm), F-number, and half angle of view (degrees) is represented by a value when the optical system according to each example is in an in-focus state on an infinity object (at infinity). The "back focus" is a distance on the optical axis from the final surface of the lens (the lens surface closest to the image plane) to a paraxial image plane in terms of air equivalent length. An "overall lens length" is a length obtained by adding the back focus to the distance on the optical axis from the frontmost surface (a lens surface closest to the object) to the final surface of the optical system. The "lens unit" includes one or more lenses.

If the optical surface is aspheric, an asterisk * is attached to the right side of the surface number. The aspherical shape is represented as follows:

$$X=(h^2/R)/[1+\{1-(1+K)(h/R)^2\}]^{1/2}+A4\times h^4+A6\times h^6+A8\times h^8+A10\times h^{10}+A12\times h^{12}$$

where X is a displacement amount from a surface vertex in the optical axis direction, h is a height from the optical axis in a direction orthogonal to the optical axis, R is a paraxial radius of curvature, K is a conical constant, A4, A6, A8, A10, and A12 are aspherical coefficients of respective orders.

"$e^{\pm XX}$" in each aspherical coefficient means "$\times 10^{\pm XX}$."

NUMERICAL EXAMPLE 1
UNIT: mm
Surface Data

| Surface No. | r | d | nd | vd |
|---|---|---|---|---|
| 1 | 45.999 | 2.00 | 1.77250 | 49.6 |
| 2 | 19.037 | 6.11 | | |
| 3* | 20.524 | 2.00 | 1.49700 | 81.5 |
| 4* | 11.924 | 14.53 | | |
| 5 | −34.204 | 1.40 | 1.49700 | 81.5 |
| 6 | 66.841 | 6.18 | 1.84666 | 23.8 |
| 7 | −43.198 | 1.54 | | |
| 8 | −29.354 | 1.20 | 1.94594 | 18.0 |
| 9 | −345.384 | 2.04 | | |
| 10 | 76.242 | 5.53 | 2.00100 | 29.1 |
| 11 | −52.136 | 1.00 | | |
| 12 | −87.065 | 1.00 | 1.80000 | 29.8 |
| 13 | 39.112 | 5.88 | 1.53775 | 74.7 |
| 14 | −61.329 | 0.15 | | |
| 15 | 140.232 | 3.30 | 2.00100 | 29.1 |
| 16 | −79.219 | 3.27 | | |
| 17 | −35.786 | 1.00 | 1.59551 | 39.2 |
| 18 | 56.288 | 1.79 | 1.94594 | 18.0 |
| 19 | 90.764 | 2.39 | | |
| 20 | 161.169 | 3.05 | 1.59522 | 67.7 |
| 21 | −88.110 | 1.00 | | |
| 22(Diaphragm) | ∞ | 6.03 | | |
| 23 | −267.436 | 0.80 | 1.65412 | 39.7 |
| 24 | 73.925 | 0.15 | | |
| 25 | 26.821 | 10.66 | 1.49700 | 81.5 |
| 26 | −26.956 | 0.90 | 1.72047 | 34.7 |
| 27 | −95.816 | 0.15 | | |
| 28 | 26.034 | 6.33 | 1.49700 | 81.5 |
| 29 | −115.808 | 8.70 | | |
| 30* | −11385.852 | 2.50 | 1.85400 | 40.4 |
| 31* | 53.435 | 1.00 | | |
| 32 | 39.949 | 6.77 | 1.49700 | 81.5 |
| 33 | −67.804 | 1.20 | 1.85478 | 24.8 |
| 34 | −148.451 | 12.15 | | |
| Image Plane | ∞ | | | |

Aspheric Data
3rd Surface
K=0.00000e+000  A4=−2.41374e−005  A 6=2.66951e−008  A 8=−7.74059e−011  A10=1.77746e−014
4th Surface
K=−1.04458e+000  A4=2.06945e−006  A 6=2.46920e−008  A 8=−8.48027e−011
30th Surface
K=0.00000e+000  A 4=−8.19322e−005  A 6=1.55857e−007  A 8=8.01308e−011  A10=−9.41515e−013
31st Surface K=0.00000e+000  A 4=−4.83741e−005  A 6=2.39145e−007  A 8=−5.32181e−011  A10=−6.89055e−013
Focal Length: 14.30
Fno 1.44
Half Angle of View (degree): 56.5
Overall lens length 123.69
BF 12.15

NUMERICAL EXAMPLE 2
UNIT: mm
Surface Data

| Surface No. | r | d | nd | vd |
|---|---|---|---|---|
| 1 | 41.167 | 2.00 | 1.77250 | 49.6 |
| 2 | 18.277 | 6.48 | | |
| 3* | 20.216 | 2.00 | 1.49700 | 81.5 |
| 4* | 11.196 | 12.72 | | |
| 5 | −36.549 | 1.40 | 1.49700 | 81.5 |
| 6 | 96.566 | 4.36 | 1.85478 | 24.8 |
| 7 | −51.541 | 2.45 | | |
| 8 | −24.329 | 1.20 | 1.94594 | 18.0 |
| 9 | −89.671 | 2.38 | | |
| 10 | 228.445 | 4.67 | 1.90043 | 37.4 |
| 11 | −40.827 | 1.00 | | |
| 12 | 290.730 | 1.00 | 1.84666 | 23.8 |
| 13 | 37.037 | 5.59 | 1.70154 | 41.2 |
| 14 | −89.055 | 1.00 | | |
| 15 | 50.578 | 3.46 | 1.94594 | 18.0 |
| 16 | −1297.226 | 0.15 | | |
| 17 | 48.954 | 0.99 | 1.64769 | 33.8 |
| 18 | 26.161 | 6.06 | | |
| 19 | −29.945 | 1.00 | 1.61293 | 37.0 |
| 20 | −43.997 | 1.00 | | |
| 21(Diaphragm) | ∞ | 6.00 | | |
| 22 | −228.377 | 0.80 | 1.63980 | 34.5 |
| 23 | 70.060 | 0.15 | | |
| 24 | 29.850 | 9.75 | 1.49700 | 81.5 |
| 25 | −23.499 | 0.90 | 1.76182 | 26.5 |
| 26 | −53.730 | 0.15 | | |
| 27 | 27.052 | 8.04 | 1.49700 | 81.5 |
| 28 | −77.884 | 6.86 | | |
| 29* | −9993.255 | 2.50 | 1.85400 | 40.4 |
| 30* | 57.332 | 1.00 | | |
| 31 | 36.236 | 5.98 | 1.49700 | 81.5 |
| 32 | −224.962 | 1.20 | 1.85478 | 24.8 |
| 33 | −839.098 | 13.26 | | |
| Image Plane | ∞ | | | |

Aspheric Data
3rd Surface
K=0.00000e+000  A 4=−3.25963e−005  A 6=3.69158e−008  A 8=−1.11928e−010  A10=7.18986e−014
4th Surface
K=−1.51002e+000  A 4=4.08082e−005  A 6=−6.86300e−008  A 8=5.70637e−011
29th Surface
K=0.00000e+000  A 4=−1.96185e−005  A 6=−7.39653e−008  A 8=2.56837e−010  A10=−5.67631e−013
30th Surface
K=0.00000e+000  A 4=1.28253e−005  A 6=−3.74763e−008  A 8=3.47109e−010  A10=−7.18916e−013
Focal Length: 14.30
Fno 1.44
Half Angle of View (degree): 56.53
Overall lens length 117.50
BF 13.26

NUMERICAL EXAMPLE 3
UNIT: mm
Surface Data

| Surface No. | r | d | nd | vd |
|---|---|---|---|---|
| 1 | 110.478 | 1.20 | 1.48749 | 70.2 |
| 2 | 21.266 | 11.48 | | |
| 3 | −29.640 | 1.00 | 1.49700 | 81.5 |
| 4 | 49.198 | 3.48 | | |
| 5 | 94.394 | 10.37 | 1.91082 | 35.3 |
| 6 | −22.678 | 1.20 | 1.85478 | 24.8 |
| 7 | −65.536 | 1.00 | | |
| 8 | −3505.263 | 2.73 | 1.59282 | 68.6 |

-continued

NUMERICAL EXAMPLE 3
UNIT: mm
Surface Data

| Surface No. | r | d | nd | vd |
|---|---|---|---|---|
| 9 | −110.997 | 4.90 | | |
| 10 | 41.287 | 4.41 | 1.59282 | 68.6 |
| 11 | 3116.861 | 1.29 | | |
| 12 | 140.240 | 6.13 | 1.80400 | 46.6 |
| 13 | −34.574 | 1.00 | 1.56660 | 19.1 |
| 14 | −27.319 | 0.99 | 1.59551 | 39.2 |
| 15 | 61.895 | 3.30 | | |
| 16(Diaphragm) | ∞ | 6.65 | | |
| 17 | −33.899 | 5.61 | 1.59522 | 67.7 |
| 18 | −15.080 | 0.90 | 1.68893 | 31.1 |
| 19 | −1688.609 | 0.15 | | |
| 20 | 35.766 | 9.47 | 1.59282 | 68.6 |
| 21 | −33.311 | 0.15 | | |
| 22* | 140.088 | 3.90 | 1.85400 | 40.4 |
| 23* | −70.411 | 1.00 | | |
| 24 | 87.268 | 1.00 | 1.61340 | 44.3 |
| 25 | 26.907 | 6.40 | | |
| 26 | −64.818 | 1.00 | 1.85478 | 24.8 |
| 27 | 746.640 | 0.22 | | |
| 28 | 61.048 | 4.14 | 1.92286 | 20.9 |
| 29 | −4739.779 | 13.46 | | |
| Image Plane | ∞ | | | |

Aspheric Data
22nd Surface
K=0.00000e+000 A 4=−2.75324e−005 A 6=−4.86143e−008 A 8=−1.73828e−010 A10=9.21692e−013
23rd Surface
K=0.00000e+000 A 4=−1.02537e−005 A 6=−4.09503e−008 A 8=−3.61973e−011
A10=5.72179e−013
Various Data
Focal Length: 24.48
Fno 1.44
Half Angle of View (degree): 41.47
Overall lens length 108.53
BF 13.46

Table 1 below illustrates various values in each numerical example.

TABLE 1

| | Exp. 1 $\|f1/f\|$ | Exp.2 f2/f | Exp.3 f3/f | Exp.4 sk/f | Exp.5 f/r21 | Exp.6 t1/f | Exp. 7 $\|f11/f\|$ |
|---|---|---|---|---|---|---|---|
| Example 1 | 18.467 | 4.823 | 3.079 | 0.849 | −0.164 | 2.974 | 3.038 |
| Example 2 | 3.108 | 10.146 | 2.479 | 0.927 | 0.049 | 2.774 | 3.093 |
| Example 3 | 3.354 | 7.896 | 1.631 | 0.550 | −0.007 | 1.174 | 2.216 |

Image Pickup Apparatus

Figure 10:
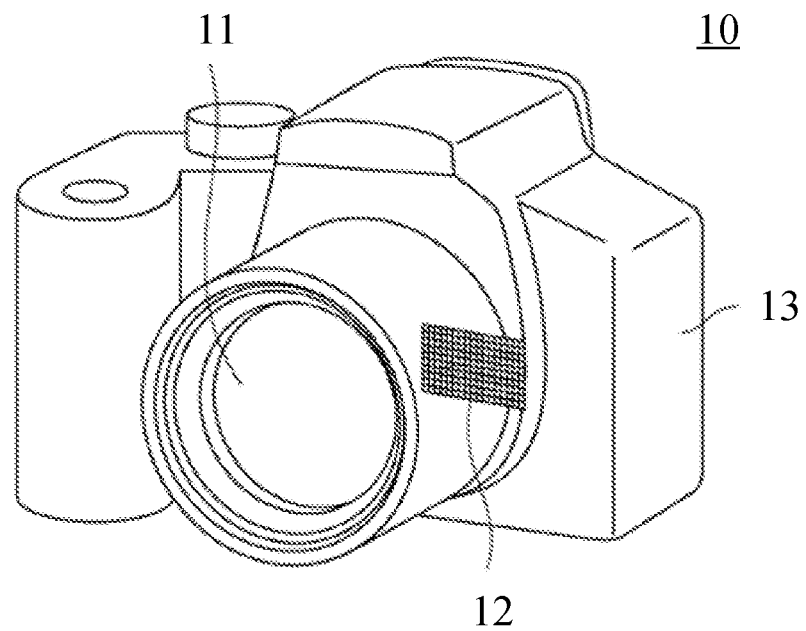
FIG. 10 is a schematic diagram of an image pickup apparatus.

Referring now to FIG. 10, a description will be given of an example of a digital still camera (image pickup apparatus) using the imaging optical system according to each example. In FIG. 10, reference numeral 10 denotes a camera body, and reference numeral 11 denotes any of the imaging optical systems described in Examples 1 to 3. Reference numeral 12 denotes a solid-state image sensor (photoelectric conversion element) such as a CCD sensor or a CMOS sensor, which is built in the camera body and receives an optical image formed by the imaging optical system 11 and performs photoelectric conversion. The camera body 10 may be a so-called single-lens reflex camera having a quick turn mirror, or a so-called mirrorless (non-reflex) camera having no quick turn mirror.

When the imaging optical system according to each example to an image pickup apparatus such as a digital still camera in this way, the image pickup apparatus having a small lens can be provided.

Each example can provide an optical system having good optical performance during image stabilization and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-112065, filed on Jul. 6, 2021, which is hereby incorporated by reference herein in its entirety.

What is claimed is:

1. An optical system comprising, in order from an object side to an image side, a first lens unit having a negative refractive power, a second lens unit having a positive refractive power, and a third lens unit having a positive refractive power, wherein during image stabilization, the second lens unit is moved in a direction including a component in a direction orthogonal to an optical axis of the optical system, and the first lens unit and the third lens unit are fixed, wherein the third lens unit includes four positive lenses and four negative lenses, and wherein the following conditional expressions are satisfied:

$$2.0<|f1/f|<100.0$$

$$4.4<f2/f<100.0$$

$$-0.3<f/r21<0.1$$

where f is a focal length of the optical system in an in-focus state at infinity, f1 is a focal length of the first lens unit, f2 is a focal length of the second lens unit, and r21 is a radius of curvature of a lens surface closest to an object in the second lens unit.

2. The optical system according to claim 1, wherein part of the third lens unit is moved during focusing.

3. The optical system according to claim 1, wherein the following conditional expression is satisfied:

$$1.0<f3/f<10.0$$

where f3 is a focal length of the third lens unit in the in-focus state at infinity.

4. The optical system according to claim 1, wherein the following conditional expression is satisfied:

$$0.3<sk/f<3.0$$

where sk is a distance on the optical axis from a lens surface closest to an image plane to the image plane in the in-focus state at infinity.

5. The optical system according to claim 1, wherein the following conditional expression is satisfied:

$$0.5<t1/f<5.0$$

where t1 is a distance on the optical axis from a lens surface closest to the object of the first lens unit to a lens surface closest to an image plane of the first lens unit.

6. The optical system according to claim 1, wherein the first lens unit includes a negative lens disposed closest to the object.

7. The optical system according to claim 1, wherein the following conditional expression is satisfied:

$$1.0 < |f11/f| < 5.0$$

where f11 is a focal length of a lens disposed closest to the object of the first lens unit.

8. The optical system according to claim 1, wherein the first lens unit includes one positive lens and three negative lenses.

9. The optical system according to claim 1, wherein the third lens unit includes four positive lenses and four negative lenses.

10. The optical system according to claim 1, wherein the second lens unit consists of a negative lens, a positive lens, and a positive lens arranged in order from the object side to the image side.

11. The optical system according to claim 1, wherein the second lens unit consists of a negative lens and a positive lens arranged in order from the object side to the image side.

12. The optical system according to claim 1, wherein the second lens unit consists of one positive lens.

13. The optical system according to claim 1, wherein the second lens unit is fixed during focusing.

14. The optical system according to claim 1, wherein the first lens unit is fixed during focusing.

15. The optical system according to claim 1, wherein the first lens unit includes a negative meniscus lens having a convex shape toward the object side and a biconcave lens.

16. An image pickup apparatus comprising:
an optical system; and
an image sensor configured to receive an image formed by the optical system,
wherein the optical system includes, in order from an object side to an image side, a first lens unit having a negative refractive power, a second lens unit having a positive refractive power, and a third lens unit having a positive refractive power,
wherein during image stabilization, the second lens unit is moved in a direction including a component in a direction orthogonal to an optical axis of the optical system, and the first lens unit and the third lens unit are fixed,
wherein the third lens unit includes four positive lenses and four negative lenses, and
wherein the following conditional expressions are satisfied:

$$2.0 < |f1/f| < 100.0$$

$$4.4 < f2/f < 100.0$$

$$-0.3 < f/r21 < 0.1$$

where f is a focal length of the optical system in an in-focus state at infinity, f1 is a focal length of the first lens unit, f2 is a focal length of the second lens unit, and r21 is a radius of curvature of a lens surface closest to an object in the second lens unit.

* * * * *